United States Patent [19]

Berman

[11] 4,127,102
[45] Nov. 28, 1978

[54] HEAT ABSORBING WINDOW

[76] Inventor: Mark H. Berman, 144 Spring St., Passaic, N.J. 07055

[21] Appl. No.: 797,020

[22] Filed: May 16, 1977

[51] Int. Cl.² .............................................. F24J 3/02
[52] U.S. Cl. .................................. 126/270; 126/271
[58] Field of Search ................ 126/270, 271; 237/1 A

[56] References Cited
U.S. PATENT DOCUMENTS

| | | | |
|---|---|---|---|
| 3,107,052 | 10/1963 | Garrison | 126/271 |
| 3,955,555 | 5/1976 | Bostrom | 126/270 |
| 3,974,823 | 8/1976 | Patil | 126/271 |
| 3,996,918 | 12/1976 | Quick | 126/270 |
| 4,050,443 | 9/1977 | Peck et al. | 126/270 |

Primary Examiner—Kenneth W. Sprague
Attorney, Agent, or Firm—Richard L. Miller

[57] ABSTRACT

A heat absorbing window which can receive solar energy and transmit the illumination part of the solar energy, while utilizing the heat part of such energy to provide a source of heat for useful purposes. The window includes a frame with three window panes. The outermost pane faces the exterior and is of non-heat absorbing material. The middle pane is of heat absorbing material, and the innermost pane can be either clear or of absorbing material. The space between the first and middle window panes defines an insulation space therebetween. The space between the middle and the inner window panes defines a fluid chamber wherein a fluid is passed. While in the chamber, the fluid is heated from the heat absorbed by the abutting heat absorbing window panes. The heated fluid is sent to a heat exchanger to extract the heat and provide useful heating purposes.

8 Claims, 5 Drawing Figures

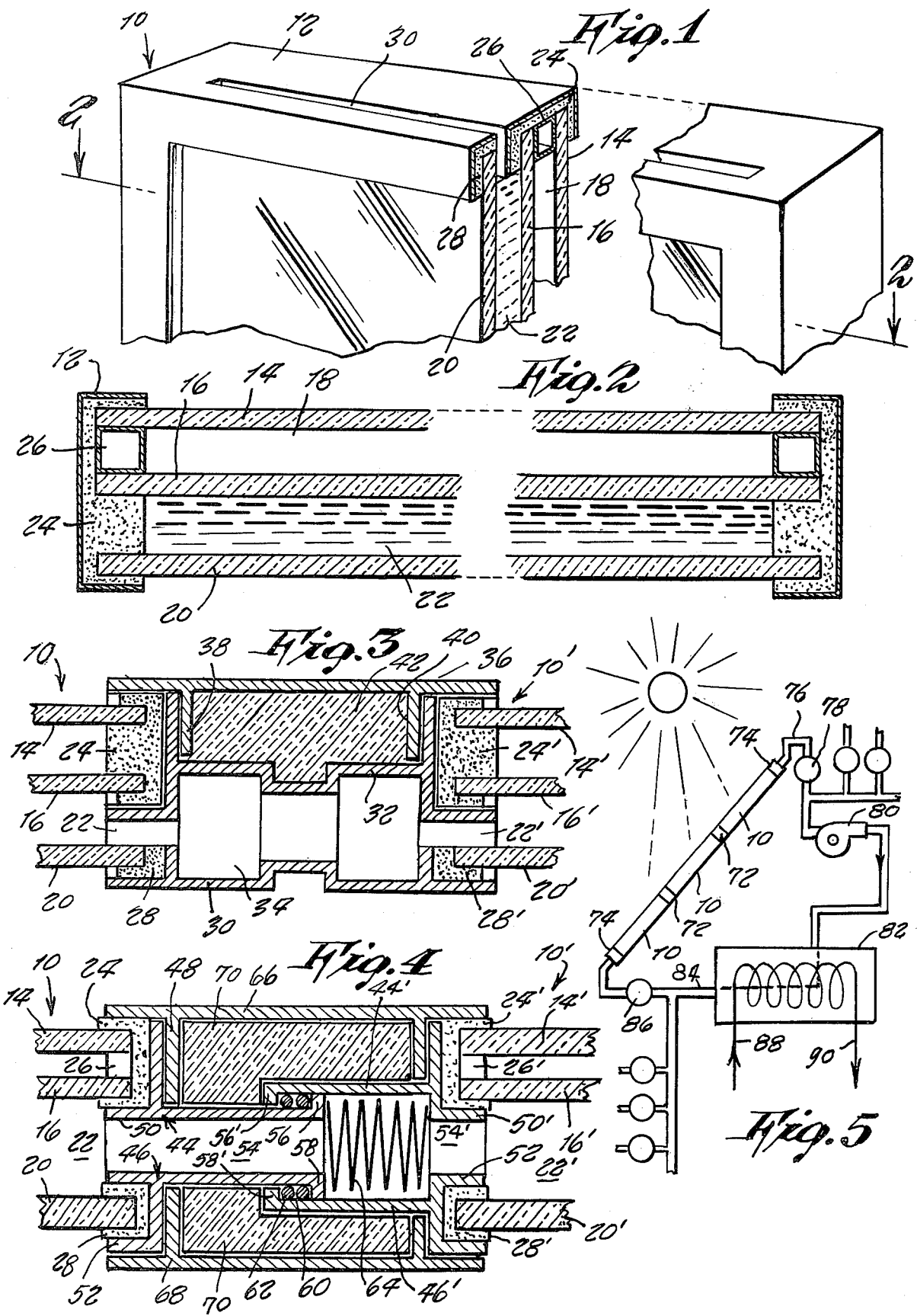

HEAT ABSORBING WINDOW

BACKGROUND OF THE INVENTION

This invention relates to solar energy systems, and more particularly to a heat absorbing window which can utilize the heat from a solar energy source while transmitting the illumination contained in that solar energy.

With the increased energy shortage and the high cost of fuel there is a great need to find alternate energy sources which are readily available and which can be utilized to provide low cost heating. One source of such energy is the sun. The use of solar energy to operate heating units in housing facilities has long been recognized and numerous systems for such purpose are readily available. Most of the existing solar energy systems utilize solar panels placed on the roof of housings, to receive the heat and convert the solar energy to useful heating purposes. However, the number of solar panels needed to heat a house has been found to be excessive. Most houses have insufficient roof space to accommodate all of the solar panels needed to provide solar heating for that house. As a result, either the use of solar energy systems is completely avoided, or, the solar energy system must be supplemented by additional energy sources.

Another problem with existing solar energy systems is that they do not always face the position of the sun during various times of the day and during the various seasons. The sun moves along the sky from sunrise to sunset, and in order to obtain most efficient solar heating it is necessary to track the movement of the sun. However, even in tracking the daytime movement of the sun there is still the problem of the changing angle during seasonal changes. Therefore, complex tracking systems must be provided, or alternately, numerous directional solar panels must be placed on the roof.

SUMMARY OF THE INVENTION

A readily available position for solar energy conversion is the window area of a building structure. Windows are normally placed around all sides of a housing and the total window area is generally quite large. Therefore, it would be most beneficial if the window areas themselves could be utilized as part of a solar energy conversion system. The positioning of the windows around all sides of the structure could accommodate the changing location of the sun during day and seasonal changes. At the same time, the total window area would probably be sufficient to provide enough solar energy panels to supply the necessary heating for the building structure.

However, existing solar panels could not be placed in the windows since they would prevent the illumination from passing into the building structure. Furthermore, a fluid medium could not be provided with existing windows.

Accordingly, it is an object of the present invention to provide heat absorbing windows which can be utilized in place of the normal windows of a building structure, and which will permit the passage of the illumination part of solar energy to thereby illuminate the building structure, while at the same time utilizing the heating part of the solar energy to heat a fluid moving within the window. The fluid can then be sent to a heat exchanger where the heat is extracted and utilized for heating purposes within the building structure.

It is therefore an object of the present invention to provide an improved heat absorbing window for use in a solar energy system.

Another object of the present invention is to provide a heat absorbing window which can pass illumination.

Yet another object of the present invention is to provide an efficient solar energy system, by utilizing the windows of the building structure for the solar panels.

Another object of the present invention is to provide a heat absorbing window structure having a fluid channel for conveying the heat absorbed from the solar energy.

Still another object of the present invention is to provide a heat absorbing window having a fluid channel and an insulation channel.

A further object of the present invention is to provide a plurality of interconnected heat absorbing windows with connecting links or manifolds for passing a fluid continuously through the plurality of windows.

Another object of the present invention is to provide a solar energy system extracting heat from solar energy by means of heat-absorbing windows.

Further objects of the invention will appear as the description proceeds.

Briefly, the invention comprises a heat absorbing window having a frame member. A first window pane formed of heat absorbing material is retained by the frame member and positioned on the exterior side of the window. The first window pane can receive thereon solar energy and will absorb the heat from such solar energy while transmitting the illumination therefrom. A second window pane is also retained by the frame member and positioned on the interior side of the window. The second window pane will also transmit therethrough the illumination from the solar energy. The second window pane can either be of clear or of heat absorbing material. The first and second window panes define a fluid chamber therebetween. An entry port is formed on the frame member for introducing a fluid into the fluid chamber. An exit port is also provided for removing the fluid from the fluid chamber. The fluid is heated by the absorbed heat as it passes through the fluid chamber.

In an embodiment of the invention, a third window pane is also provided and is formed of non-heat absorbing material. The third window pane is retained by the frame member on the exterior side of the first window pane and in spaced relationship therewith. The first and third window pane define an insulation space therebetween.

The invention also provides for connecting manifolds which interconnect the exit port of one window pane and the entry port of the next window pane to form a plurality of serially connected heat absorbing windows.

The invention also contemplates a solar energy system comprising a plurality of series connected heat absorbing windows, with the various series of windows being coupled to a heat exchanger. The system can include drive means for moving the fluid through conduits interconnecting the system. Also, individual valves can be interposed between each series of windows and the exchanger, whereby each series can be individually disconnected from the heat exchanger.

BRIEF DESCRIPTION OF THE DRAWINGS

In the drawings:

FIG. 1 is a fragmentary perspective view of the heat absorbing window of the present invention.

FIG. 2 is a cross-sectional view taken along line 2—2 of FIG. 1.

FIG. 3 is a cross-sectional view through a connecting manifold, interconnecting two adjacent heat absorbing windows.

FIG. 4 is a modified design of an interconnecting manifold, and including a self-locking feature.

FIG. 5 schematically shows the use of the heat absorbing windows in a complete solar heating system.

In the various figures of the drawing like reference characters designate like parts.

DESCRIPTION OF THE PREFERRED EMBODIMENTS

The heat absorbing window shown generally at 10 includes an outer frame member 12 which retains a number of window panes. The exterior most pane 14 is formed of non-heat absorbing material and typically of standard clear glass. The pane 14 receives solar energy and transmits substantially all of the energy; both its heat and its illumination.

Spaced from the first pane 14 is a second window pane 16 formed of heat absorbing material. The area 18 between the panes 14 and 16 define an insulation space therebetween. The insulation space 18 can either contain dry gas at atmospheric pressure or other transparent insulation material. However, this section should not impede the passage of the solar radiation into the rest of the window.

Spaced from the second window pane 16 and positioned internally of the window frame, is a third window pane 20. The space between the window panes 16 and 20 defines a fluid channel 22 in which the working fluid flows for transporting the heat energy to a heat exchanger.

The process involved is as follows: solar energy, generally in the form of sunlight, contains both heat and illumination energy. The solar energy falls on the exterior pane 14 and passes through that into the insulation space 18. The solar energy retains a high percentage of its solar heat and substantially all of its illumination. The sunlight then strikes the second window pane 16 formed of heat absorbing material. A large amount of the heat is retained by this window pane. The illumination portion, however, passes through the window pane 16 and on through the fluid contained in the fluid channel 22. The fluid is of such a quality that it does not impede the passage therethrough of the illumination.

The illumination, in the form of light, continues to pass through the last window pane 20. This window pane can either be of clear material or of heat absorbing material. In either case, it will permit the illumination to pass through that pane. Thus, the light striking the first pane 14 will provide illumination through the entire window to be used inside the building structure on which is positioned the improved window. However, the heat will be absorbed by the window pane 16, and if the pane 20 is also of absorbing material, it will also aid in the retention of the heat. As the fluid passes through the fluid chamber 22, it will be heated by the window panes 16 and 20 defining and bounding the fluid channel 22. The heat transmitted to the fluid will then be conveyed as the fluid is taken out of the fluid chamber 22. By providing a continuous flow of fluid through the fluid chamber 22, the heat can continuously be removed and provided for useful purposes.

It will thus be appreciated, that the first window pane 14 serves a dual purpose. Firstly, it acts as the exterior window pane of the window. At the same time, it defines one side of an insulation chamber. In a similar manner, the window pane 16 also serves as both a dual function as the heat absorbing member and at the same time defining a fluid channel on one side and the insulation channel on the other side. Finally, the interior window pane 20 also serves as both a regular window pane of the window inside the structure, and to define the other part of the fluid chamber.

The window panes are maintained in the frame member 12 by means of a support such as a homogeneous, pliable gasket, or glazing compound 24. Additionally, a rectangular tubing 26 can be provided on all sides of the frame and spaced between the peripheral edges of the first and second window panes 14, 16. The rectangular tubing 26 can contain desicant material or other type of drying agents to avoid moisture accumulation in the window panes. Additionally, the gasket material can also contain water resistant materials. The panes can be attached by means of an adhesive sealant that resists separation due to thermally caused motion, including expansion and contraction. The materials are also of a type which will not deteriorate under sunlight and which maintain the integrity of the insulating space. The gasket or other glazing support material 28 is also provided as a support for the third window pane 20 positioned at the interior side of the window.

An opening or slot 30 is provided in the window frame member 12 to permit entry and exit of the working fluid into the fluid chamber 22 as will hereinafter be described.

The windows are arranged in series one adjacent to the other with the working fluid provided at one end, and moving to the opposite end, and then to the next adjacent window frame. The movement is generally provided in an upward direction in accordance with the natural flow of heated substances. Thus, fluid is initially provided at the bottom entry port of one window frame and is heated as it passes through the frame and then passes out through the exit port at the upper end of that frame. It is then directed into the next adjacent window frame in that series, and so continues all through the plurality of interconnected window frames of a single series.

In order to provide an interconnection between adjacent window frames, there is included a connecting link, or connecting manifold between adjacent windows.

Referring now to FIG. 3, there is shown one such embodiment of a connecting manifold which connects a first window, typically a lower window 10 shown on the left, with the next adjacent window, typically an upper window 10', and shown on the right. The lower window includes the three window panes 14, 16, 20, as heretofore described and held by means of the material 24 and 28. The next adjacent upper frame 10' also includes panes 14', 16', 20', and is also interconnected by means of the support material 24' and 28'. The interconnecting manifold includes a first interconnecting bracket member 30 which fits over their interior section of the two adjacent windows and is positioned respectively over the innermost window panes 20 and 20'. A second bracket member 32 includes arms which fit over the first two window panes of each window and extends into the fluid channels 22, 22' of the respective adjacent windows. The two brackets 30, 32 provide an interconnecting chamber 34 in fluid communication between the fluid chamber 22 of the window 10, and the fluid chamber 22' and the window 10'. Thus, fluid flowing upward from the lower window 10 can pass through the interconnecting chamber 34 and continue onward to the upper fluid chamber 20' of the next adjacent window, 10'. It is noted, that the brackets 30, 32 include inwardly directed center sections within the bracket which provide support, as well as other improved results. On the exterior of the window is provided a securing brace 36 which serves as a front plate for the interconnection and fits between the adjacent windows. Arms 38, of the brace 36 space the adjacent windows and provide a brace for the brackets. The space between the brace 36 and the bracket 32 is filled with insulation material 40 such as foam, or other such insulation, and provides a moisture barrier as well.

An alternate embodiment of an interconnecting manifold is shown in FIG. 4, and includes a self-locking feature. In the embodiment shown in FIG. 4, the first lower window 10 has opposing brackets 44 and 46 positioned against its window frames. Bracket 44 includes a single leg 48 covering the two window panes 14 and 16 with a portion of the leg 50 extending into the fluid channel 22. The bracket 46 includes a lower U shaped member 52 which fits over the window pane 20. The extending arms of the bracket 44, 46 define a first channel 54. The remote ends of the channel walls have outwardly directed flanges 56, 58, respectively.

The adjacent upper window 10' includes similarly positioned brackets which are identified by means of primed numbers. It should be noted, however, that the remote ends of the second brackets 56', 58', have inwardly directed flanges. The flanges 56, 56', as well as 58, 58', define a closed space 60 which actually extends peripherally around the transverse section of the window at its point of interconnection. Gaskets 62 are placed within the openings 60. A spring 64 is positioned between the two brackets and biases the flanges towards each other so that the flanges will compress the gasket 62 therebetween and provide a self-closing and self-locking seal therebetween. It should be noted that the inter-connecting chambers 54, 54' are in fluid flow communication with each other, and with the fluid chambers 22, 22' of the adjacent windows. Thus, fluid flowing outward of the lower window 10 can pass through the interconnecting chamber 54, 54' and continue through the chamber 22' of the next adjacent window.

Thus, in the embodiment of FIG. 3 there is provided a static type manifold which includes the necessary glazing supports, fluid channel interconnection, insulation, caps, etc. In the embodiment shown in FIG. 4 there is provided a self-locking manifold which adds the spring closing device and water seals within the sliding sleeves of the interconnecting channels.

In FIG. 4 there is also provided a front brace 66 and rear brace 68 whose legs space apart the brackets and accordingly, the windows. The chambers formed between the braces and the brackets are filled with insulating material 70.

Referring now to FIG. 5 there is shown a complete solar system incorporating a plurality of individual windows 10 interconnected by means of the connecting manifolds 72. At the ends of this series of windows, there are provided end manifolds 74 which are substantially one half of the individual manifolds shown in FIGS. 3 and 4. Conduits 76 lead from the windows past the valves 78 and through a drive means shown as the impeller 80 towards a heat exchanger 82. The heated fluid passes through the exchanger and continues through additional conduit 84 and further valves 86 back to the input end of the series of windows. The additional valves and conduits which are shown would interconnect to other series of windows. Another fluid would be sent into the heat exchanger 82 passing therein along line 88 and back out through line 90. Such other fluid can be sent to domestic heating supplies, space heaters, as well as being used for other types of heating within the housing unit. The valves are one way valves and permit directional flow only in one direction through the system. It is noted that separate valves are provided for each series of windows, so that should a leak occur within a particular window or series of windows, that series can be disconnected by closing the valves at the input and output of that series without effecting the remaining flow through the other series of windows. The type of heat exchanger utilized as well as the remaining heating system, is of standard construction, and is well known in the art. The type of fluid utilized to pass through the heat absorbing windows can be either air or liquid. Preferably, the working fluid will be a mixture of water with an antifreeze additive, such as approximately 10% propyleneglycol or similar substance. However, the system can also utilize air as the flowing medium. In an air activated system, the fluid channel would probably be larger, as for example a fluid channel of 3 inches by 24 inches. The working fluid being a gas would require a simpler interconnecting manifold of a similar nature to those described. The manifold would probably appear as a rectangular tube that interlocks with the glazing panels at the fluid portals. When the fluid is a liquid, such as water, then the fluid system should preferably be a closed system as shown in FIG. 5. With an air system it could as well be an open system, where the air would not be reused but would continuously be freshly supplied from the environment.

The edges of the device are generally sealed with a semi-flexible rubber gasket as heretofore described. The fluid portals, however, at the surfaces of the channel would be opened. The gasket is secured by the metal guard frame at the outermost edges of the device, which in turn is continuous except for at the fluid portals at which point, the guard extends sufficiently into the fluid channel to protect the edges of the glass.

With various special requirements of building codes, minor variations of the present absorbant system may be necessary. For example, with building codes that require glass which protects from shattering, it may be necessary to utilize wired safety glass rather than laminated glass. Lamination glass would probably reduce the solar transmission of the device, while the wired safety glass would satisfy the building codes and yet still maintain the novel features of the invention. However, it should be noted that such wired safety glass would only need be in the exterior sheet alone.

It should be further appreciated that the exterior most pane of glass 14 need not always be provided. For example, in exceedingly warm climates where no heat insulation is needed, the outermost pane can be completely eliminated and only the two panes defining the fluid chamber need be provided.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A heat absorbing window comprising:
   a frame member;
   a first window pane of heat absorbing material retained by said frame member on the exterior side of the window for receiving thereon solar energy, absorbing the heat therefrom, while transmitting the illumination therefrom;
   a second window pane retained by said frame member on the interior side of the window for transmitting therethrough said illumination;
   said first and second window panes defining a fluid chamber therebetween;
   entry and exit ports formed in said frame member for respectively introducing a fluid into said fluid chamber and removing the fluid from said fluid chamber, the fluid being heated by the absorbed heat as it passes through the fluid chamber;
   a third window pane formed of non-heat absorbing material, retained by said frame member on the exterior side of said first window pane and in spaced relationship therewith, said first and third window panes defining an insulation space therebetween; and
   connecting manifolds for interconnecting the exit port of one window with the entry port of the next adjacent window, said connecting manifolds comprising a connector for spacing apart the adjacent windows and for forming a connection chamber, said connection chamber being in fluid flow communication between the fluid chambers of the adjacent windows, an exterior connecting brace for spacedly interconnecting the frame members of said adjacent windows, said connector and connecting brace defining a closed chamber therebetween, insulation material positioned in said closed chamber, and interconnecting members for insulatingly connecting the manifold to the adjacent windows.

2. A heat absorbing window as in claim 1 and further comprising a tubing coupled within said frame member and separating the peripheral edges of said first and third window panes, said tubing receiving a drying agent.

3. A heat absorbing window as in claim 1 and further comprising glazing support material in said frame member for holding the edges of the window pane in said frame member.

4. The heat absorbing window as in claim 1 and wherein said connecting manifolds further comprise a first bracket for interconnection to the frame member of one window and including a first channel in fluid communication with the fluid chamber of said one window, the remote ends of said first channel having outwardly directed flanges, a second bracket for interconnection to the frame member of an adjacent window and including a second channel in fluid communication with the fluid chamber of said adjacent window, the remote ends of said second channel having inwardly directed flanges, said first and second channel being in fluid communication with each other, said flanges defining an enclosure therebetween, gasket means positioned in said enclosure, and spring means for biasing said flanges towards each other to compress the gasket means therebetween.

5. The heat absorbing window as in claim 1 and further comprising a plurality of heat absorbing windows connected in a series, heat exchanger means, conduit means interconnecting said series with said heat exchanger means, and drive means for moving the fluid through the conduit.

6. The heat absorbing window as in claim 5 and further comprising a plurality of such series interconnecting windows, and individual valve means respectively interposed between each said series of windows and said heat exchanger, whereby each said series of windows can be individually disconnected from the heat exchanger.

7. The heat absorbing window as in claim 1 and wherein said fluid is a mixture of water with an antifreeze additive.

8. The heat absorbing window as in claim 1 and wherein said fluid is air.

* * * * *